United States Patent
Whitman

(10) Patent No.: US 7,548,647 B2
(45) Date of Patent: Jun. 16, 2009

(54) METHOD AND APPARATUS FOR DIGITAL-IMAGE RED-EYE CORRECTION THAT FACILITATES UNDO OPERATION

(75) Inventor: Christopher A. Whitman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 665 days.

(21) Appl. No.: 11/119,192

(22) Filed: Apr. 29, 2005

(65) Prior Publication Data

US 2006/0245644 A1 Nov. 2, 2006

(51) Int. Cl.
*G06K 9/00* (2006.01)
(52) U.S. Cl. .................. 382/167; 382/117; 382/175; 382/275
(58) Field of Classification Search ........... 382/167, 382/175, 117, 275; 358/520; 348/370, 222.1, 348/231.6, E5.049
See application file for complete search history.

(56) References Cited

U.S. PATENT DOCUMENTS 6,009,209 A * 12/1999 Acker et al. ............... 382/275
6,278,491 B1 * 8/2001 Wang et al. ............... 348/370
6,873,743 B2 * 3/2005 Steinberg .................. 382/275
7,024,035 B1 * 4/2006 Enomoto ................... 382/167
7,042,501 B1 * 5/2006 Matama .................... 348/222.1

OTHER PUBLICATIONS

Huitao Luo, et.al, "Detecting and Correctring Redeye in an Image", HP pending patent application 200313342-1, filed Aug. 29, 2003, U.S. Appl. No. 10/653,019, 59 pages.
Amy E Battles,et.al, "User Interface for Automatic Red-Eye Removal in a Digital Image", HP pending patent appl 200400322-1,filed Jan. 28, 2004,U.S. Appl. No. 10/767,355, 20 pgs.

* cited by examiner

*Primary Examiner*—Anh Ohng Do

(57) ABSTRACT

A device that performs automatic red-eye correction on a digital image saves the original image data and a location indicator from each portion of the digital image on which red-eye correction is performed to facilitate the subsequent undoing of red-eye correction. Red-eye correction may be undone at any time after red-eye correction has been performed by replacing the corrected image data with the original image data that is stored with the corrected digital image, and the device on which red-eye correction is undone may be distinct from the device that captured the digital image and from the device that performed red-eye correction on the digital image.

31 Claims, 11 Drawing Sheets

METHOD AND APPARATUS FOR DIGITAL-IMAGE RED-EYE CORRECTION THAT FACILITATES UNDO OPERATION

FIELD OF THE INVENTION

The present invention relates generally to digital photography and more specifically to techniques for correcting red-eye effect in a digital image and user interfaces associated with such techniques.

BACKGROUND OF THE INVENTION

A pervasive problem in flash photography is the red-eye effect, in which an on-camera flash reflects off the back of the eyes of a subject, causing the eyes to appear red. The problem is so common that many digital photo-editing applications include an automatic or manual red-eye correction feature. Some digital cameras are also capable of performing automatic in-camera red-eye correction.

Automatic red-eye correction is not foolproof, however. In some cases, a user may desire to undo red-eye correction in one or more portions of a digital image. Furthermore, the user may desire to undo red-eye correction long after red-eye correction was originally performed on the digital image or after the digital image has been transferred to an electronic device different from the device that performed red-eye correction.

It is thus apparent that there is a need in the art for an improved method and apparatus for digital-image red-eye correction that facilitates an undo operation.

DETAILED DESCRIPTION OF THE INVENTION

Undoing red-eye correction may be facilitated by storing with the red-eye-corrected digital image the original image data (i.e., the uncorrected pixels) from each portion of the original digital image in which red-eye correction was performed ("red-eye region"). Since the number of pixels altered by red-eye correction is generally small, saving the original image data from each red-eye region with the corrected digital image adds little to the size of the corrected digital image. A location indicator (e.g., coordinates) and an optional size indicator (e.g., width and height dimensions) for each red-eye region may also be saved with the corrected digital image. Data such as the original image data, the location indicator, and the optional size indicator may be stored as file metadata with the corrected digital image in a single digital image file.

Storing the corrected digital image as explained above facilitates undoing red-eye correction in one or more red-eye regions. The location indicator (and, optionally, the size indicator) may be used to locate a given red-eye region in the corrected digital image. The corrected image data in that red-eye region may be replaced with the original image data from that red-eye region to undo red-eye correction. Moreover, this undo operation may be performed (1) as long as desired after red-eye correction is originally performed and (2) on any device capable of reading and interpreting the metadata, even if that device does not have red-eye correction capability and even if red-eye correction was performed on a different device. That is, the information necessary to enable the undoing of red-eye correction in specific red-eye regions "travels" with the corrected digital image file. A suitable user interface may provide a user with the ability to select and undo red-eye correction in a particular red-eye regions (or in all red-eye regions globally) or to redo red-eye correction in one or more red-eye regions, if the user changes his or her mind.

The principles of the invention may be applied to a wide variety of electronic devices, including digital imaging devices such as digital cameras and computing devices such as personal computers.

Figure 1A:
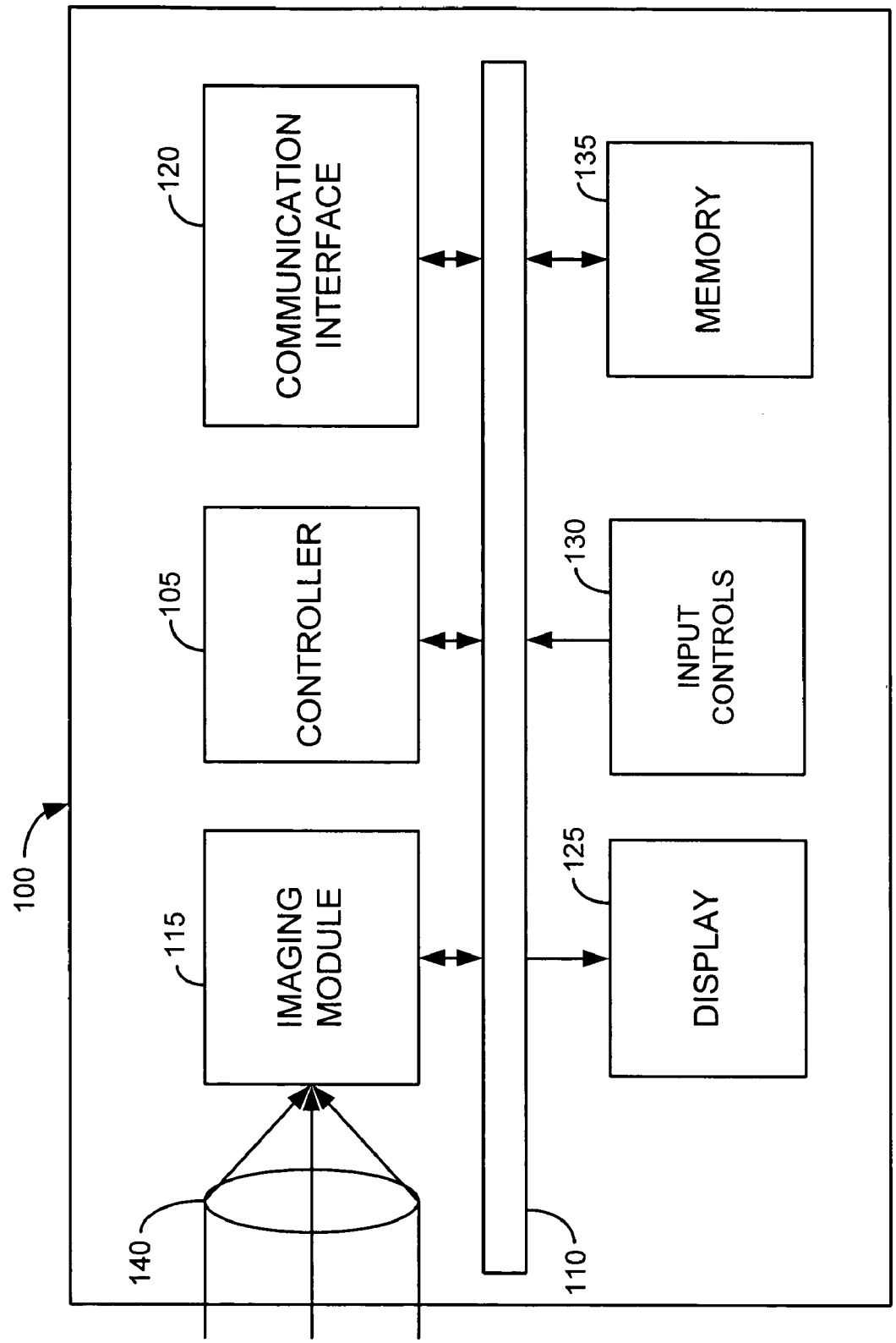
FIG. 1A is a functional block diagram of a digital camera in accordance with an illustrative embodiment of the invention.

FIG. 1A is a high-level block diagram of a digital camera 100 in accordance with an illustrative embodiment of the invention. In FIG. 1A, controller 105 communicates over data bus 110 with imaging module 115, communication interface 120, display 125, input controls 130, and memory 135. Optical system 140 produces optical images that are converted to digital images by imaging module 115. Controller 105 may, e.g., comprise a microprocessor or microcontroller. Imaging module 115 may comprise an array of photosensors based on charge-coupled-device (CCD), CMOS, or other imaging-sensor technology; an analog-to-digital converter (A/D); a gain control; and a digital signal processor (DSP) (not shown in FIG. 1A). Communication interface 120 may be of the hard-wired variety, such as Universal Serial Bus (USB) or Firewire (IEEE 1394), or it may be wireless, such as Bluetooth or IEEE 802.11. Communication interface 120 may be used to transfer digital image data from digital camera 100 to an external device such as a PC. Display 125 may, e.g., comprise a liquid crystal display (LCD). Input controls 130 may include navigational controls (e.g., directional controls), a menu/"ok" button, a shutter release button, or other controls, physical or virtual, for controlling the operation of digital camera device 100.

Figure 1B:
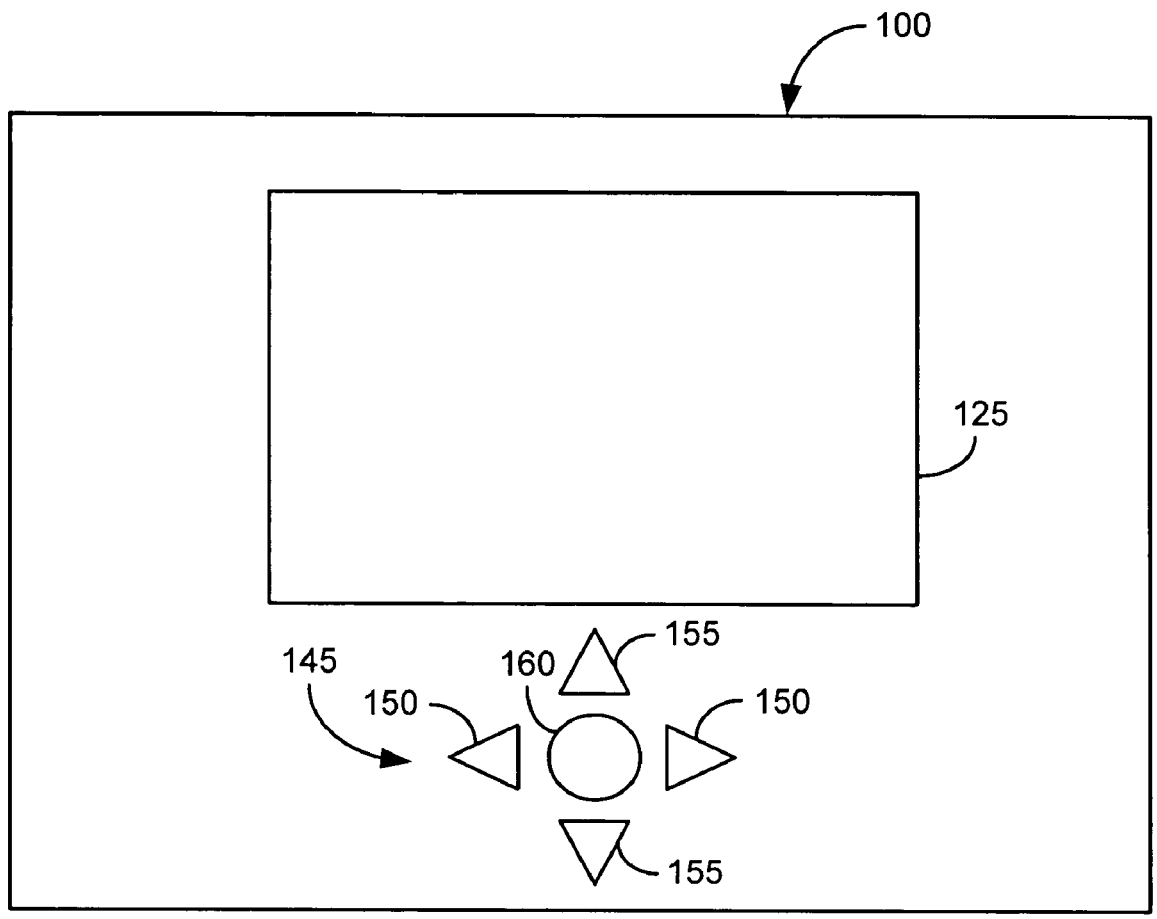
FIG. 1B is an illustration of the display and some of the input controls of the digital camera shown in FIG. 1A in accordance with an illustrative embodiment of the invention.

FIG. 1B is an illustration of display 125 and some of the input controls 130 of digital camera 100 in accordance with an illustrative embodiment of the invention. In FIG. 1B, digital camera 100 may include a set of navigational and command controls 145 comprising two pairs of opposing directional controls, horizontal directional controls 150 and vertical directional controls 155, and menu/"ok" button 160. These controls may be physical buttons, or they may be virtual buttons on, e.g., a touch-sensitive screen. Navigational and command controls 145 may be used, for example, to navigate among and give focus to items on display 125 and to initiate actions in digital camera 100. For example, menu/"ok" button 160 may be used to call up a menu on display 125 and may double as an "ok" button (much like an "enter" key on a computer keyboard).

Figure 1C:
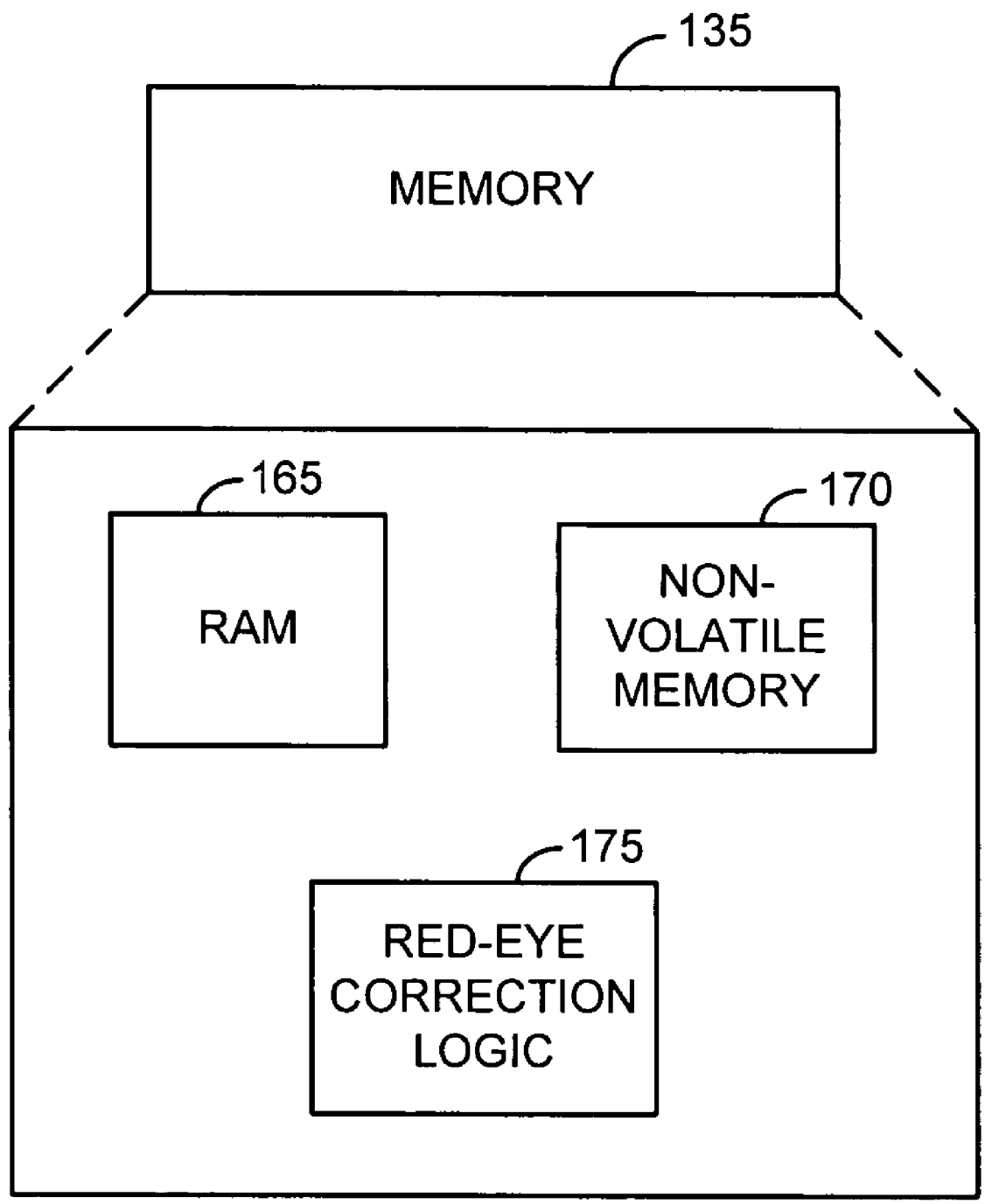
FIG. 1C is a high-level diagram of the memory of the digital camera shown in FIG. 1A in accordance with an illustrative embodiment of the invention.

FIG. 1C is a high-level diagram of memory 135 of digital camera 100 in accordance with an illustrative embodiment of the invention. In general, memory 135 may comprise both random access memory (RAM) 165 and non-volatile memory 170, which may be of the removable variety (e.g., a secure digital or multi-media memory card). Memory 135 may further comprise red-eye correction logic 175. Red-eye correction logic 175 may identify one or more red-eye regions in a digital image and perform automatic red-eye correction on those red-eye regions to produce a corrected digital image. Automatic red-eye detection and removal techniques are well known in the digital image processing art. Examples include U.S. Pat. No. 6,278,491 and pending U.S. patent application Ser. No. 10/653,019, both assigned to Hewlett-Packard Company, the disclosures of which are incorporated herein by reference. The former reference employs face detection; the latter does not. Essentially, red-eye removal involves replacing red pixels with those of a more suitable color where the red-eye effect has occurred in a digital image. Red-eye correction logic 175 may be implemented as software, firmware, hardware, or any combination thereof. In one illustrative embodiment, red-eye correction logic 175 may comprise stored program instructions residing in firmware that are executed by controller 105.

Figure 2A:
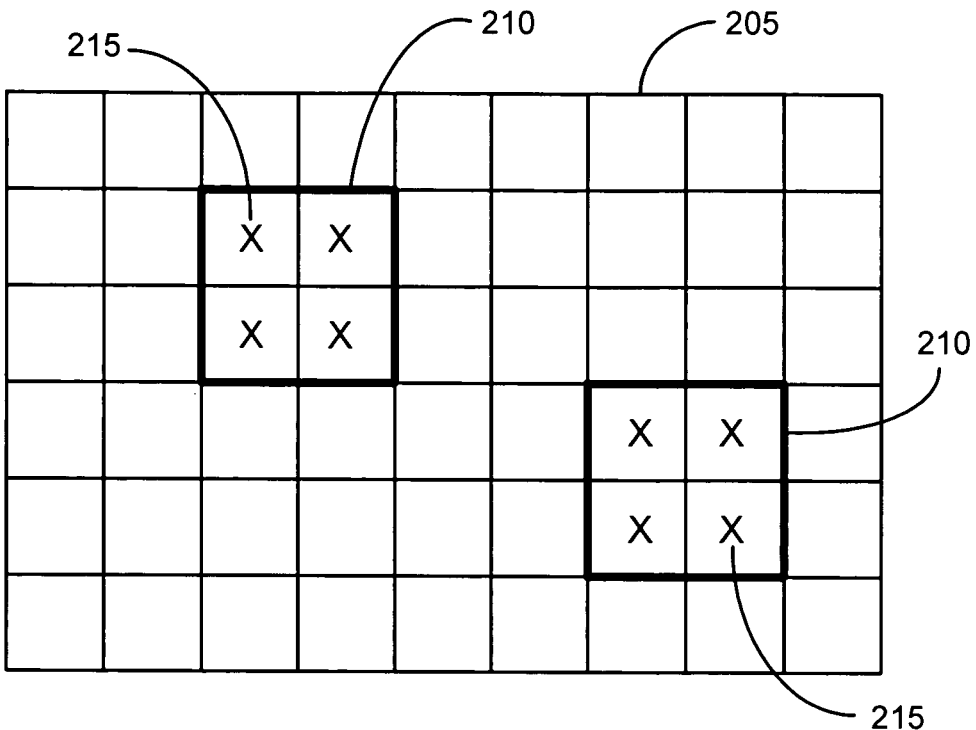
FIGS. 2A and 2B are diagrams of a simplified digital image before and after red-eye correction, respectively, in accordance with an illustrative embodiment of the invention.

FIGS. 2A-2D illustrate how red-eye correction logic 175 may perform red-eye correction and also, optionally, undo red-eye correction. FIG. 2A is a diagram of a simplified digital image 205. Red-eye correction logic 175 may identify one or more red-eye regions 210 (surrounded by bold borders for clarity in FIG. 2A) within digital image 205. As indicated above, a "red-eye region" is a portion of digital image 205 in which red-eye effect has been identified and on which red-eye correction logic 175 ultimately performs automatic red-eye correction. Within each red-eye region 210 are original image data (pixels) 215, which are indicated as "X's" in FIGS. 2A-2D.

Figure 2B:
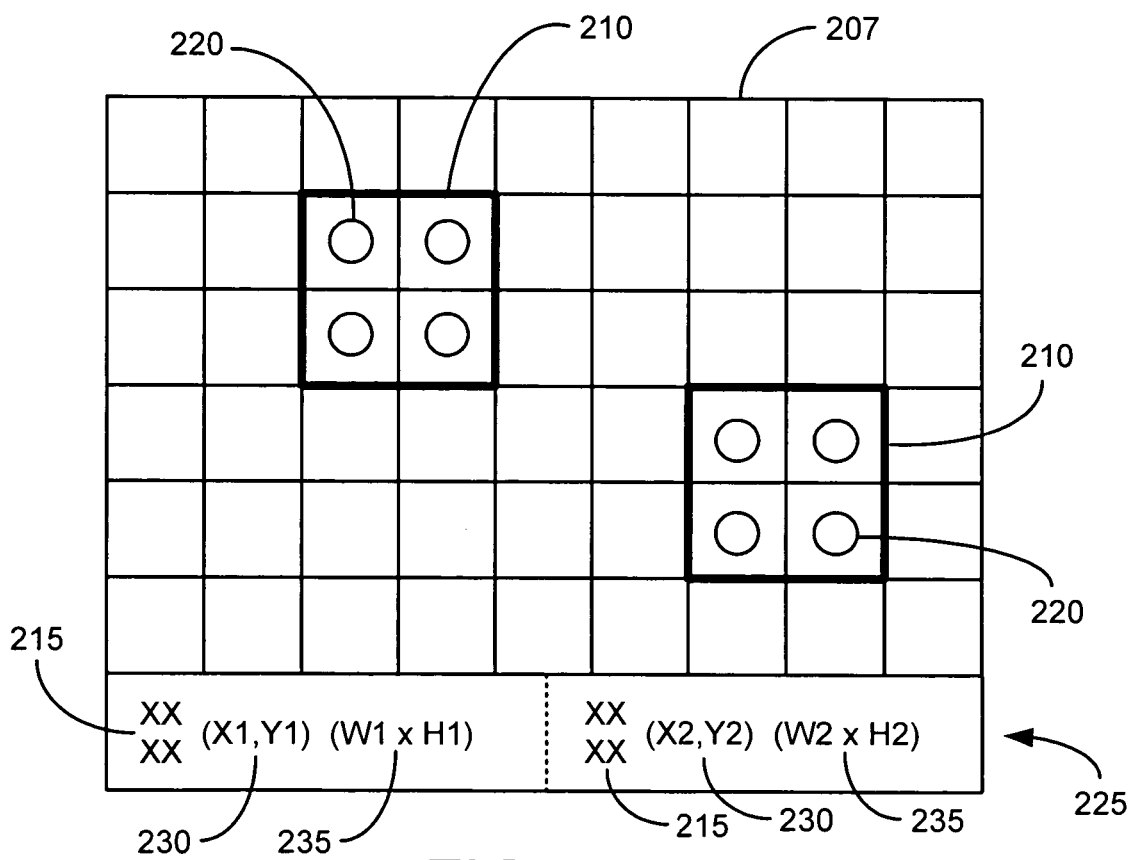

FIG. 2B is a diagram of a simplified corrected digital image 207 after red-eye correction logic 175 has performed automatic red-eye correction on each of the identified red-eye regions 210. The corrected image data 220 (i.e., the pixels to which original image data 215 were modified) are indicated with circles in FIG. 2B. Red-eye correction logic 175 may save metadata 225 with corrected digital image 207 in a single digital image file. Metadata 225 may include original image data 215, a location indicator 230, and an optional size indicator 235 for each red-eye region 210, as explained above. Though it is advantageous for original image data 215, location indicator 230, and optional size indicator 235 to be stored in the same digital image file as corrected digital image 207, they may instead be stored separately from corrected digital image 207 but in a manner that associates them with one another.

Depending on the application, original image data 215 may be stored with corrected digital image 207 in a format that does not involve any down sampling (e.g., JPEG 444 format), or it may be stored in a format that does include down sampling (e.g., JPEG 420 or 422 format). Since relatively few pixels are usually altered by red-eye correction in any one digital image 205, down sampling of original image data 215 may not be necessary.

Location indicator 230 may comprise a set of coordinates specifying the location in corrected digital image 207 of a particular corner (e.g., the upper left corner) of the corresponding red-eye region 210. This approach assumes red-eye region 210 is square or rectangular. In other embodiments, red-eye region 210 may have an irregular shape, and location indicator 230 may be designed accordingly. For example, a set of coordinates may identify the location of a particular reference pixel in the irregularly shaped red-eye region 210, and the locations of the remaining pixels in the red-eye region 210 may be specified relative to that reference pixel.

In the case of square or rectangular red-eye regions 210, optional size indicator 235 may be simply a pair of numbers specifying the width and height in pixels of the corresponding red-eye region 210, as shown in the example of FIG. 2B. In the simplified examples of FIGS. 2A-2D, each red-eye region 210 has a width and height of two pixels.

Figure 2C:
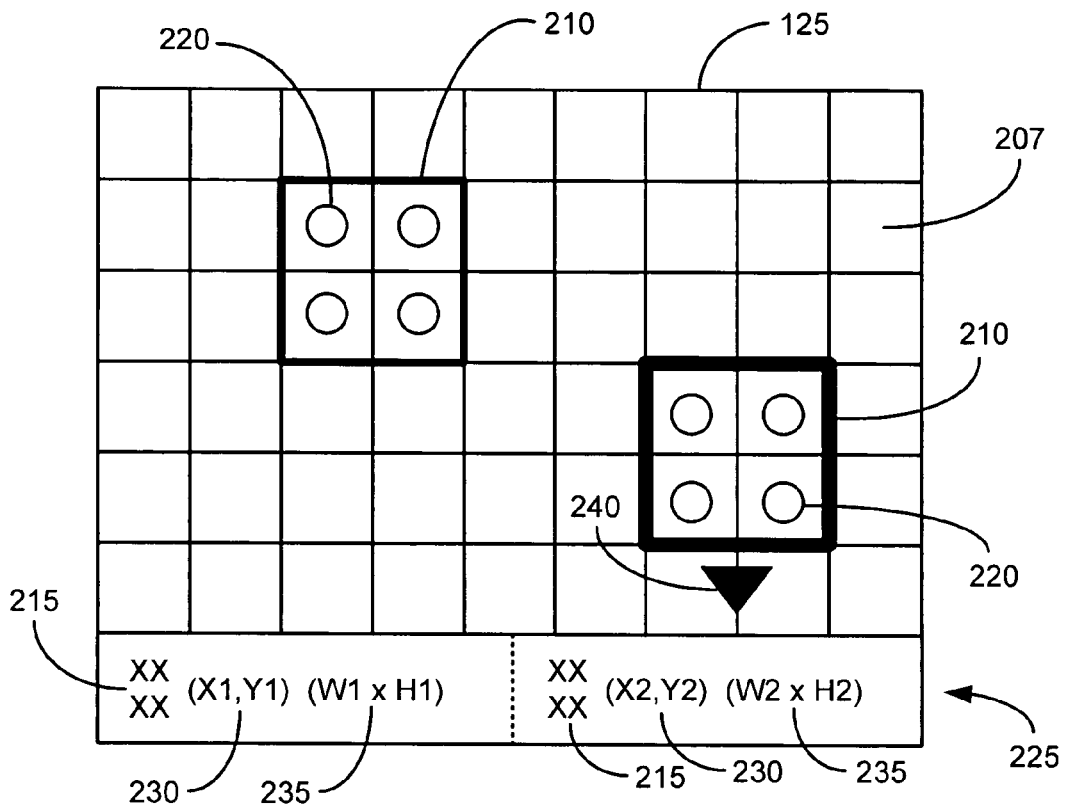
FIGS. 2C and 2D are diagrams of a simplified digital image before and after, respectively, red-eye correction has been undone in a particular red-eye region, in accordance with an illustrative embodiment of the invention.

After red-eye correction logic 175 has automatically performed red-eye correction in the identified red-eye regions 210, corrected digital image 207 may be presented to a user on display 125. One or more red-eye regions 210 in corrected digital image 207 may be marked in some fashion (e.g., a bounding box may be placed around each red-eye region 210). FIG. 2C shows a specific red-eye region 210 (on the right, surrounded by the heavier border) that has been selected (i.e., given focus) using input controls 130. In general, a navigational input function of digital camera 100 may select a particular red-eye region 210, and another input function of digital camera 100 may signal red-eye correction logic 175 to undo (or redo) red-eye correction in the selected red-eye region 210. For example, horizontal directional controls 150 may be used to navigate among the marked red-eye regions 210 and give focus to a particular red-eye region 210, and vertical directional controls 155 may be used to toggle red-eye correction in the selected red-eye region 210. Icon 240 may optionally be shown on display 125 to indicate that pressing "down" arrow 155 will undo red-eye correction in the selected red-eye region 210. Implementation of the user interface for undoing red-eye correction may take on many forms, and the foregoing is merely one example.

Figure 2D:
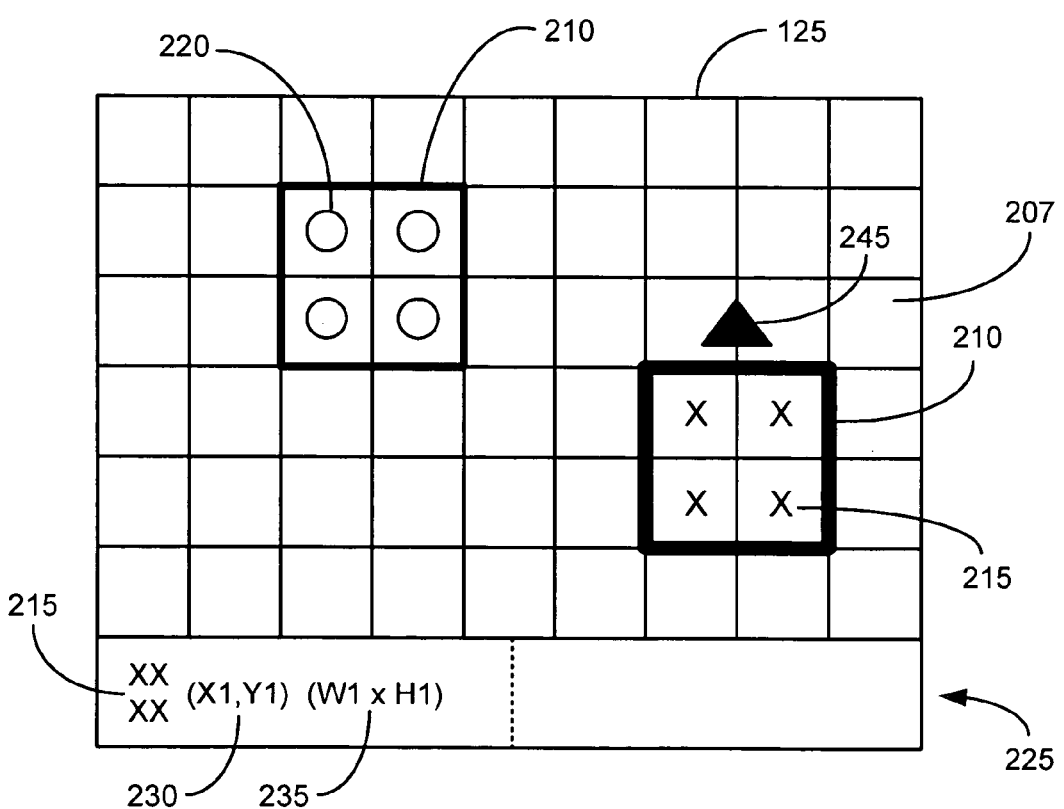

Undoing red-eye correction in the selected red-eye region 210 leads to FIG. 2D. In FIG. 2D, in the selected red-eye region 210, red-eye correction logic 175 has replaced corrected image data 220 with the original image data 215 from the selected red-eye region 210. Corrected image data 220 may be discarded or retained in memory in case the user changes his or her mind and decides to redo red-eye correction in the selected red-eye region 210, in which case red-eye correction logic 175 would again replace the original image data 215 from that red-eye region 210 with the corrected image data 220 for that red-eye region 210. In this manner, red-eye correction logic 175 may, in response to user input, "toggle" between original image data 215 and corrected image data 220 in the selected red-eye region 210. Icon 245 may optionally be shown on display 125 to indicate that pressing "up" arrow 155 will redo red-eye correction in the selected red-eye region 210. Of course, those skilled in the art will recognize that the roles of the "up" and "down" arrows may, in a different embodiment, be reversed from those just described or may be accomplished through entirely different input controls 130.

In other embodiments, red-eye correction may be undone or redone in all red-eye regions 210 through a single global "undo" or "redo" command instead of one-by-one, as illustrated in FIGS. 2C and 2D.

Though the foregoing illustrative embodiment involves a digital camera, the same principles of the invention may be applied to other electronic devices that lack optical system 140 and imaging module 115. That is, an electronic device in which the invention is implemented does not have to be capable of capturing digital images. Examples of such devices include, without limitation, desktop personal computers (PCs), notebook computers, laptop computers, personal digital assistants (PDAs), radiotelephones, and workstations that do not include an integrated or interfaced digital camera. The principles of the invention may also be applied to digital camcorders.

Figure 3A:
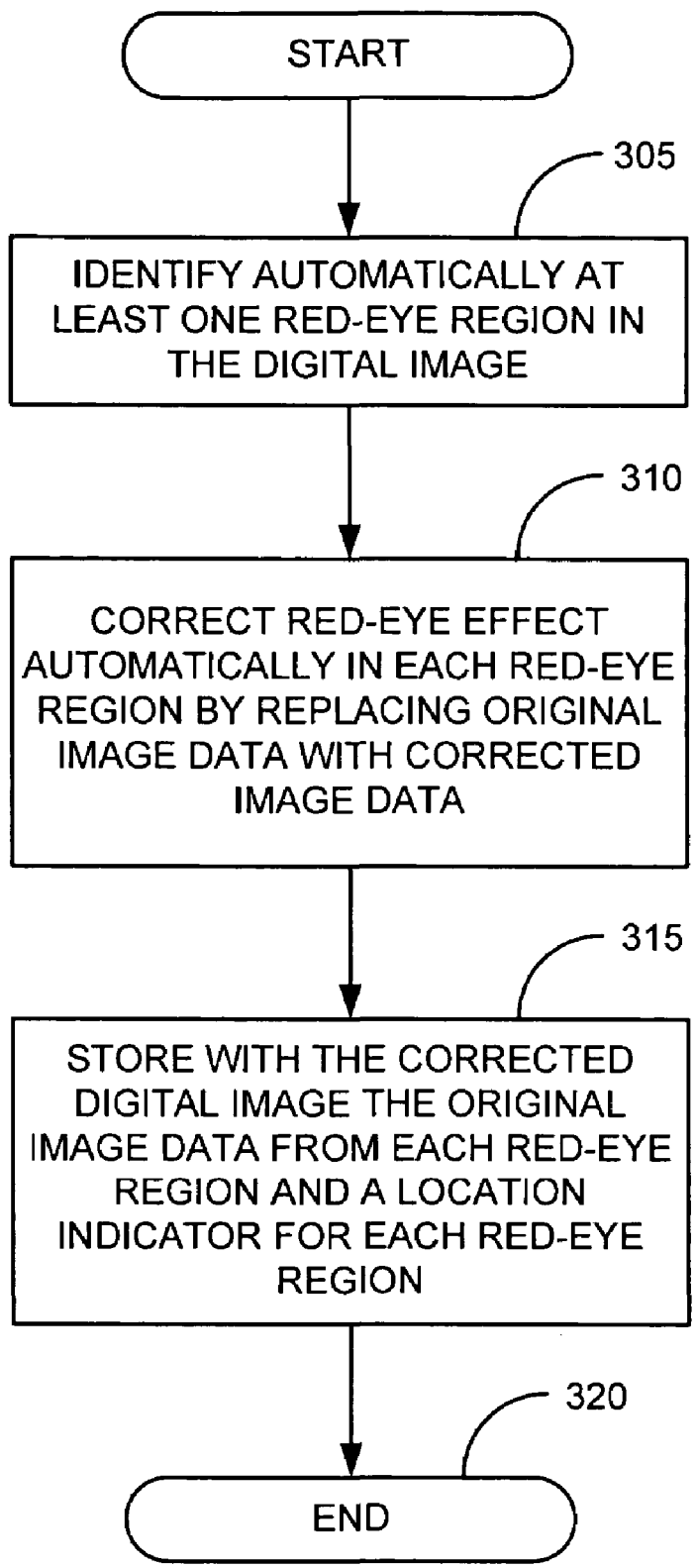
FIG. 3A is a flowchart of a method for correcting red-eye effect in a digital image in accordance with an illustrative embodiment of the invention.

FIG. 3A is a flowchart of a method for correcting red-eye effect in a digital image in accordance with an illustrative embodiment of the invention. At 305, red-eye correction logic 175 may identify automatically at least one red-eye region 210 in a digital image 205. At 310, red-eye correction logic 175 may correct the red-eye effect automatically in each red-eye region 210 by replacing original image data 215 with corrected image data 220 to produce corrected digital image 207, as explained above. Further, red-eye correction logic 175 may, at 315, store with corrected digital image 207 the original image data 215 from each red-eye region 210 and a location indicator 230 for each red-eye region 210. Optionally, red-eye correction logic 175 may also store a size indicator 235 for each red-eye region with corrected digital image 207. At 320, the process may terminate. Original image data 215, location indicator 230, and optional size indicator 235 may conveniently be stored with corrected digital image 207 as file metadata in the same digital image file.

Figure 3B:
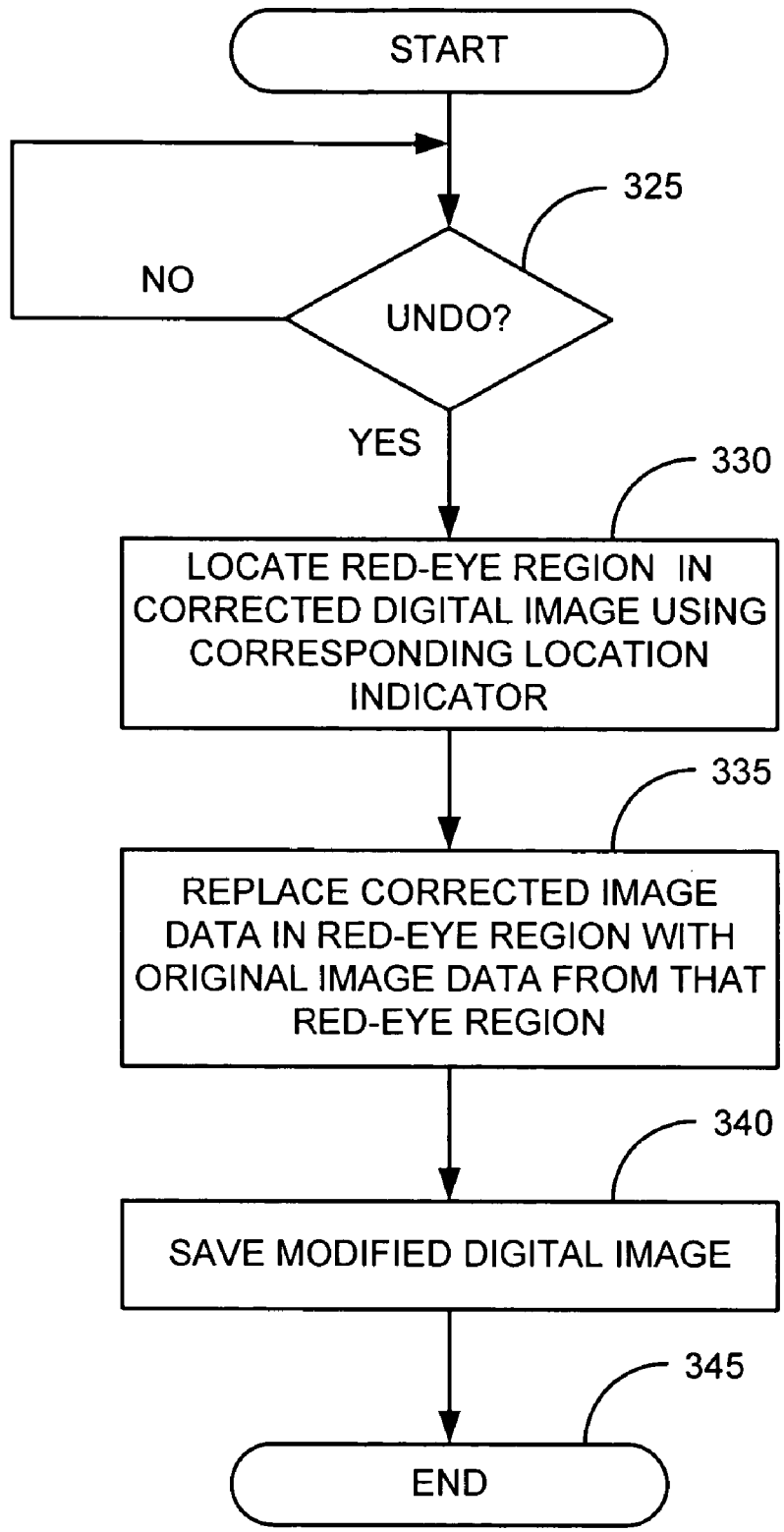
FIG. 3B is a flowchart of a method for undoing red-eye correction in a red-eye region in accordance with an illustrative embodiment of the invention.

FIG. 3B is a flowchart of a method for undoing red-eye correction in a red-eye region 210 in accordance with an illustrative embodiment of the invention. If a request to undo red-eye correction in a red-eye region 210 is received at 325, red-eye correction logic 175 may locate that red-eye region 210 within corrected digital image 207 at 330 using the corresponding location indicator 230. At 335, red-eye correction logic 175 may replace corrected image data 220 in the applicable red-eye region 210 with the original image data 215 from that red-eye region 210, effectively undoing red-eye correction in that red-eye region 210. Optionally, the modified corrected digital image 207 may be saved in memory 135 at 340. The process may terminate at 345. The method of FIG. 3B may be applied to all red-eye regions 210 globally, as explained above, or to individually selected red-eye regions 210, as explained in connection with FIGS. 2C and 2D.

Figure 3C:
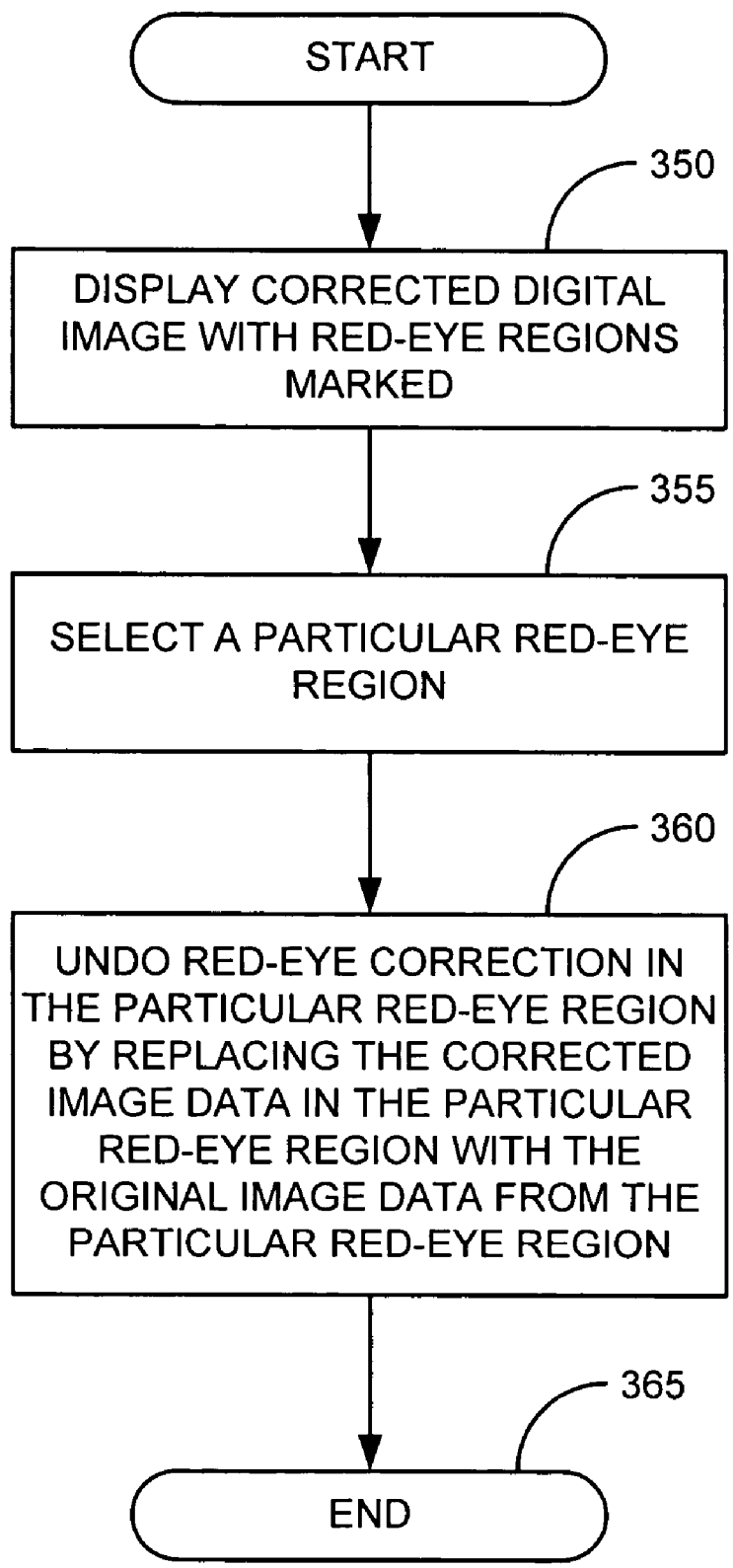
FIG. 3C is a flowchart of a user interface method for undoing red-eye correction in one or more specific red-eye regions in accordance with an illustrative embodiment of the invention.

FIG. 3C is a flowchart of a user interface method for undoing red-eye correction in one or more specific red-eye regions in accordance with an illustrative embodiment of the invention. At 350, corrected digital image 207 may be shown on display 125 in such a manner that one or more red-eye regions 210 are marked (e.g., enclosed in a bounding box). At 355, a particular red-eye region may be selected as explained in connection with FIGS. 2C and 2D. At 360, red-eye correction logic 175 may undo red-eye correction in the selected red-eye region 210 as explained in connection with FIG. 3B. At 365, the process may terminate.

Figure 4A:
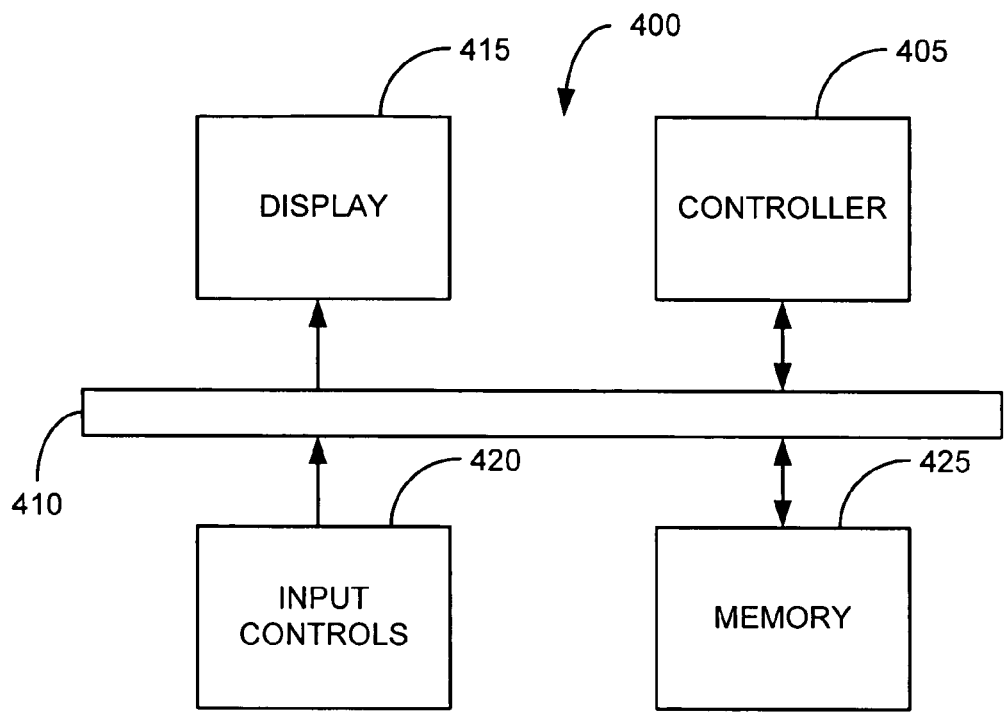
FIG. 4A is a functional block diagram of an electronic device in accordance with another illustrative embodiment of the invention.

The principles of the invention may also be applied to electronic devices that are not capable of performing red-eye correction (e.g., they lack the necessary software or firmware) but are instead capable only of storing a corrected digital image 207 and undoing red-eye correction by reading and interpreting metadata 225 that is attached to or that otherwise accompanies corrected digital image 207. FIG. 4A is a functional block diagram of such a device, electronic device 400, in accordance with another illustrative embodiment of the invention. Examples of electronic device 400 include, without limitation, desktop PCs, laptop computers, notebook computers, PDAs, radiotelephones, and workstations. In FIG. 4A, controller 405 communicates over data bus 410 with display 415, input controls 420, and memory 425. Input controls 420 may include, for example, a keyboard, a mouse, a trackball, a set of buttons (physical or virtual), or other input devices similar to those of digital camera 100 (input controls 130).

Figure 4B:
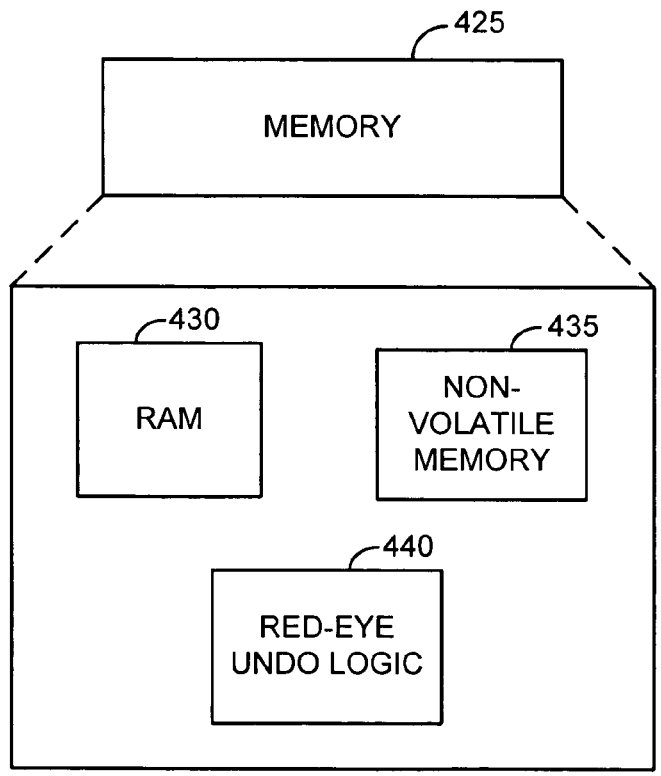
FIG. 4B is a high-level diagram of the memory of the electronic device shown in FIG. 4A in accordance with another illustrative embodiment of the invention.

FIG. 4B is a high-level diagram of memory 425. Memory 425 may comprise RAM 430, non-volatile memory 435, and red-eye undo logic 440. Red-eye undo logic 440 may undo (or redo) red-eye correction in one or more red-eye regions 210 of corrected digital image 207 using the techniques explained above (see FIG. 3B). Since the information that enables the undo operation "travels" with corrected digital image 207, red-eye undo logic 440 does not have to include red-eye correction capability. Further, electronic device 400 may be distinct from the device that captured digital image 205 and from the device that performed red-eye correction on digital image 205. For example, digital image 205 may be captured by a digital camera that includes automatic red-eye correction (such as digital camera 100), and corrected digital image 207 may be transferred to a PC. A PC that includes red-eye undo logic 440 can undo red-eye correction in one or more red-eye regions 210 by applying the techniques explained above.

Figure 5:
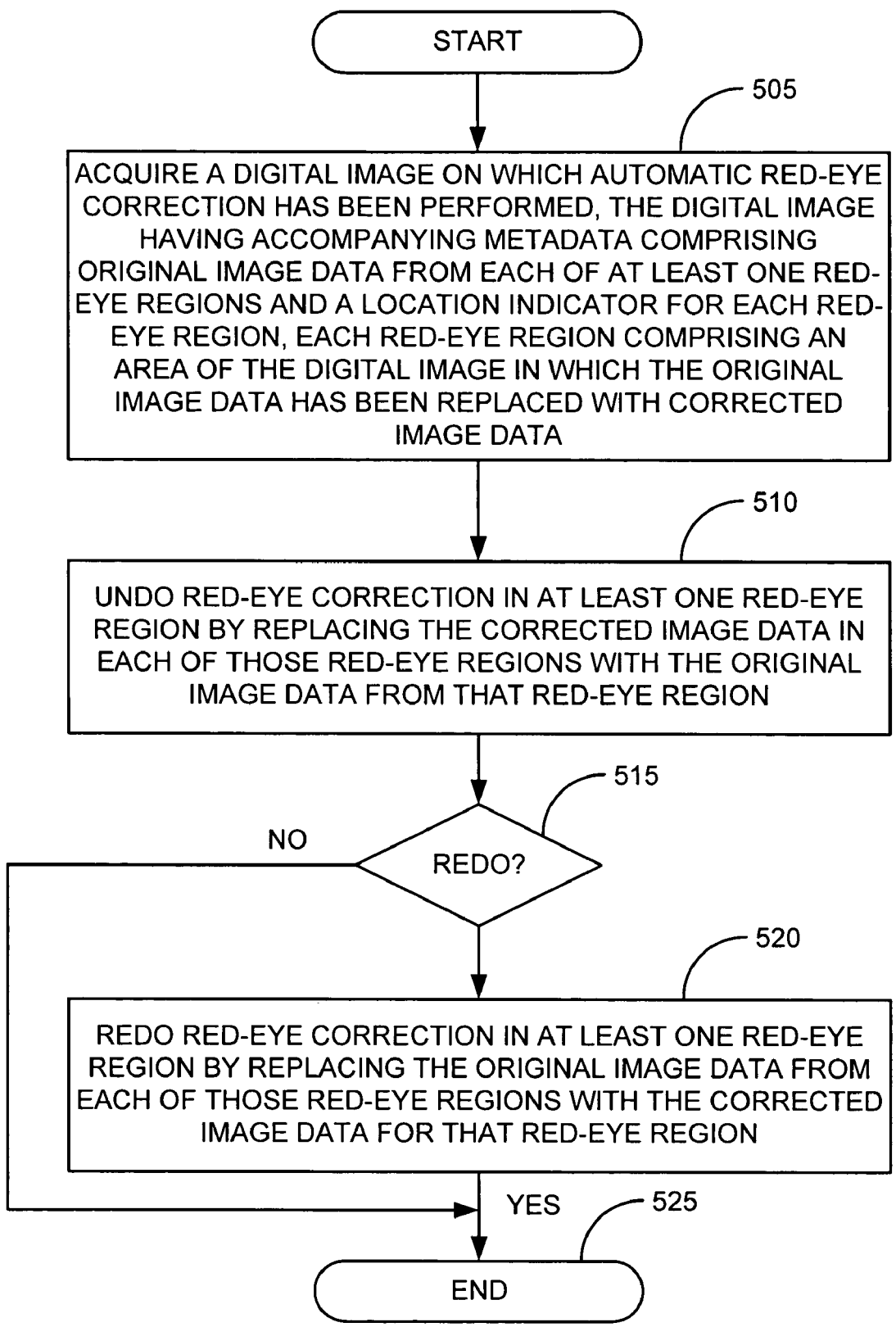
FIG. 5 is a flowchart of a method for undoing and optionally redoing red-eye correction in accordance with another illustrative embodiment of the invention.

FIG. 5 is a flowchart of a method for undoing and optionally redoing red-eye correction in accordance with another illustrative embodiment of the invention. At 505, electronic device 400 may acquire in memory 425 a corrected digital image 207 with accompanying metadata 225. At 510, red-eye undo logic 440 may undo red-eye correction in one or more red-eye regions 210 in accordance with the methods explained above (see FIGS. 3B and 3C). If a request to redo red-eye correction in one or more red-eye regions 210 is received at 515, the original image data 215 from each of those red-eye regions may be replaced with the corrected image data 220 for that red-eye region 210 at 520, and the process may terminate at 525. The final corrected digital image 207 may be saved in memory 425.

Figure 6A:
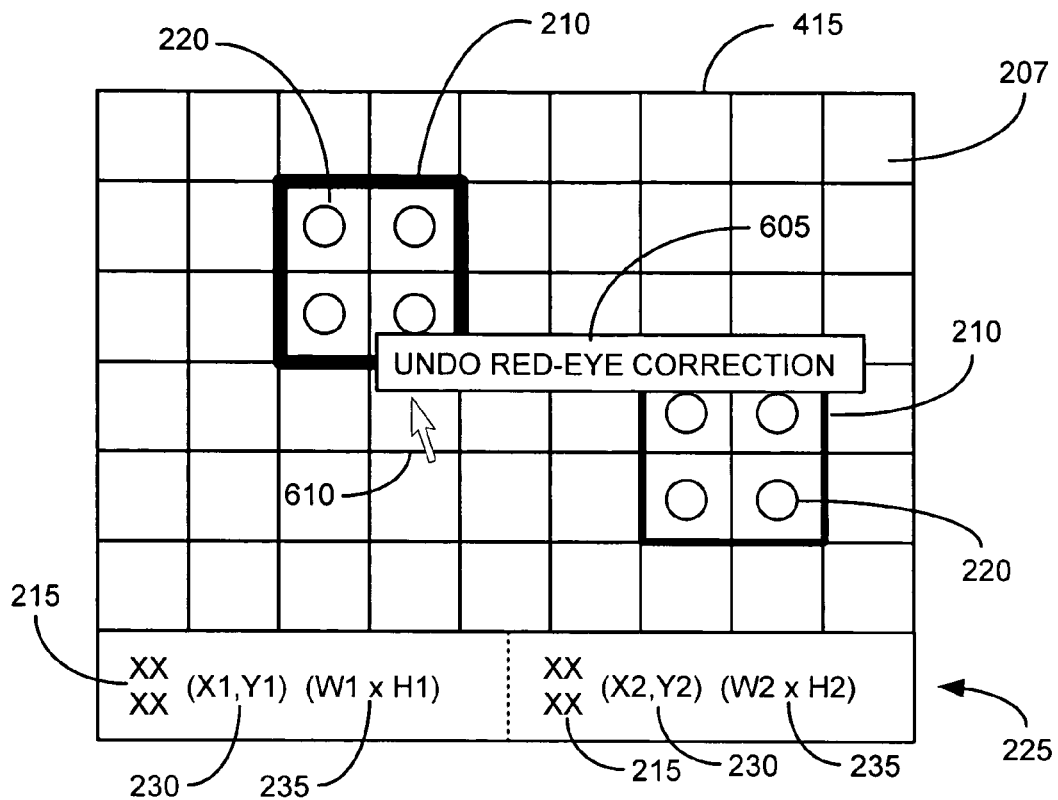
FIGS. 6A and 6B are diagrams of a simplified digital image before and after, respectively, a pointing device and menu have been used to undo red-eye correction in a selected red-eye region, in accordance with an illustrative embodiment of the invention.
Figure 6B:
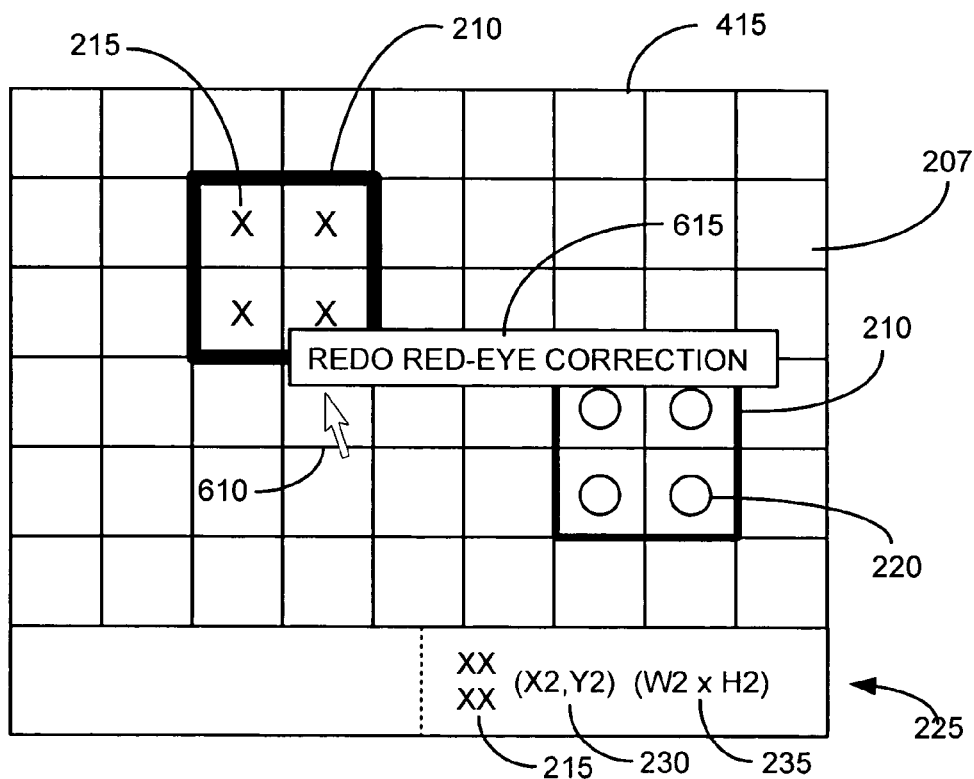

FIGS. 6A and 6B illustrate an optional user interface that may be employed in undoing and redoing red-eye correction, in accordance with an illustrative embodiment of the invention. This user interface may be implemented with either of the families of embodiments described above (i.e., devices that include automatic red-eye correction capability and those that do not). For the sake of illustration, the user interface is depicted in FIGS. 6A and 6B as appearing on display 415 of electronic device 400. In FIG. 6A, a particular red-eye region 210 has been selected via a pointing device such as a mouse or trackball. Performing an appropriate gesture upon the selected red-eye region 210 (e.g., right clicking or clicking and holding) may cause a pop-up menu 605 with an "undo" command to appear. Placing cursor 610 over pop-up menu 605 and clicking the pointing device may signal red-eye undo logic 440 to undo red-eye correction in the selected red-eye region 210 (in this example, the leftmost red-eye region 210). Repeating the foregoing actions (e.g., right clicking on the selected red-eye region 210) may cause a pop-up menu 615 with a "redo" command to appear. Placing cursor 610 over pop-up menu 615 and clicking the pointing device may redo red-eye correction in the selected red-eye region 210 in accordance with the methods explained above (see FIG. 5).

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for correcting red-eye effect in a digital image, comprising:
    using a memory for identifying automatically at least one red-eye region within the digital image;
    performing red-eye correction automatically on each of the at least one red-eye regions by replacing original image data within each red-eye region with corrected image data to produce a corrected digital image; and
    storing the corrected digital image, the original image data from each red-eye region, and a location indicator for each red-eye region, into a single file, providing the ability to undo said red-eye correction.

2. The method of claim 1, further comprising:
    undoing red-eye correction in at least one red-eye region by replacing the corrected image data in each of those red-eye regions with the original imaged-data from that red-eye region.

3. The method of claim 1, further comprising:
    displaying the corrected digital image, at least one red-eye region being marked in the corrected digital image;
    selecting a particular red-eye region in response to a navigational input; and undoing red-eye correction in the particular red-eye region by replacing the corrected image data in the particular red-eye regions with the original image data from the particular red-eye region.

4. The method of claim 3, wherein each red-eye region is enclosed within a bounding box.

5. The method of claim 3, wherein a first pair of opposing directional controls is used to issue the navigational input and a second pair of opposing directional controls is used to toggle between the corrected image data and the original image data within the particular red-eye region.

6. The method of claim 5, wherein the first pair of opposing directional controls comprises horizontal directional controls and the second pair of opposing directional controls comprises vertical directional controls.

7. The method of claim 1, wherein the location indicator for each red-eye region comprises coordinates specifying where that red-eye region is located within the corrected digital image.

8. The method of claim 1, wherein a size indicator for each red-eye region is stored with the corrected digital image in addition to the location indicator.

9. The method of claim 1, wherein the corrected digital image, the original image data from each red-eye region, and the location indicator for each red-eye region are stored in a single digital image file.

10. A method for undoing red-eye correction in a digital image, comprising:
    using a memory for acquiring a digital image on which automatic red-eye correction has been performed, the digital image having accompanying metadata comprising original image data from each of at least one red-eye regions and a location indicator for each red-eye region, each red-eye region comprising an area of the digital image in which the original image data has been replaced with corrected image data; and
    using red-eye undo logic for undoing red-eye correction in at least one red-eye region by replacing the corrected image data in each of those red-eye regions with the original image data from that red-eye region.

11. The method of claim 10, further comprising:
    redoing red-eye correction in at least one red-eye region by replacing the original image data from each of those red-eye regions with the corrected image data for that red-eye region.

12. An electronic device, comprising:
    a memory in which to store a digital image; red-eye correction logic configured to identify automatically at least one red-eye region in the digital image and to perform red-eye correction automatically on each of the at least one red-eye regions by replacing original image data within each red-eye region with corrected image data to produce a corrected digital image; and
    wherein the red-eye correction logic is further configured to save the corrected digital image, the original image data from each red-eye region, and a location indicator for each red-eye region, into a single file for storage in said memory.

13. The electronic device of claim 12, further comprising:
    an optical system to produce an optical image; and
    an imaging module to convert the optical image to the digital image.

14. The electronic device of claim 12, wherein the red-eye correction logic is further configured to undo red-eye correction in at least one red-eye region by replacing the corrected image data in each of those red-eye regions with the original image data from that red-eye region.

15. The electronic device of claim 12, further comprising:
    a display on which show the corrected digital image with at least one red-eye region marked; a first input control to select a particular red-eye region in the corrected digital image; and a second input control that signals the red-eye correction logic to undo red-eye correction in the particular red-eye region by replacing the corrected image data in the particular red-eye region with the original image data from the particular red-eye region, when the second input control is in a first state, and that signals the red-eye correction logic to redo red-eye correction in the particular red-eye region by replacing the original image data in the particular red-eye region with the corrected image data from the particular red-eye region, when the second input control is in a second state.

16. The electronic device of claim 15, wherein the first input control comprises a pair of opposing horizontal directional controls and the second input control comprises a pair of opposing vertical directional controls.

17. The electronic device of claim 16, wherein the first state comprises a "down" vertical directional control being actuated and the second state comprises an "up" vertical directional control being actuated.

18. The electronic device of claim 12, wherein the red-eye correction logic is configured to store the corrected digital image, the original image data from each red-eye region, and the location indicator for each red-eye region in a single digital image file.

19. The electronic device of claim 12, wherein the red-eye correction logic is configured to save with the corrected digital image a size indicator for each red-eye region in addition to the location indicator.

20. The electronic device of claim 12, wherein the electronic device is one of a digital camera, a digital camcorder, a PDA, a radiotelephone, a personal computer, a laptop computer, a notebook computer, and a workstation.

21. An electronic device, comprising:
a memory in which to store a digital image on which automatic red-eye correction has been performed, the digital image having accompanying metadata comprising original image data from each of at least one red-eye regions and a location indicator for each red-eye region, each red-eye region comprising an area of the digital image in which the original image data has been replaced with corrected image data; and
red-eye undo logic configured to undo red-eye correction in at least one red-eye region by replacing the corrected image data in each of those red-eye regions with the original image data from that red-eye region.

22. The electronic device of claim 21, further comprising:
a display on which to show the digital image with at least one red-eye region marked; a first input control to select a particular red-eye region in the digital image; and a second input control that signals the red-eye undo logic to undo red-eye correction in the particular red-eye region by replacing the corrected image data in the particular red-eye region with the original image data from the particular red-eye region, when the second input control is in a first state, and that signals the red-eye undo logic to restore the corrected image data to the particular red-eye region, when the second input control is in a second state.

23. The electronic device of claim 22, wherein the first and second input controls comprise a pointing device and the first and second states comprise menu options that are selectable using the pointing device.

24. The electronic device of claim 22, wherein the first input control comprises a pair of opposing horizontal directional controls and the second input control comprises a pair of opposing vertical directional controls.

25. The electronic device of claim 24, wherein the first state comprises a "down" vertical directional control being actuated and the second state comprises an "up" vertical directional control being actuated.

26. The electronic device of claim 21, wherein the digital image and the accompanying metadata reside in a single digital image file.

27. The electronic device of claim 21, wherein the accompanying metadata further comprises a size indicator for each red-eye region.

28. The electronic device of claim 21, wherein the electronic device is one of a personal computer, a laptop computer, a notebook computer, a PDA, a radiotelephone, and a workstation.

29. An electronic device, comprising:
means for storing a digital image; means for identifying automatically at least one red-eye region in the digital image;
means for performing red-eye correction automatically on each of the at least one red-eye regions by replacing original image data within each red-eye region with corrected image data to produce a corrected digital image; and
means for saving the corrected digital image, the original image data from each red-eye region, and a location indicator for each red-eye region, into a single file for storage in a memory.

30. The electronic device of claim 29, further comprising:
means for undoing red-eye correction, the means for undoing red-eye correction being configured to undo red-eye correction in at least one red-eye region by replacing the corrected image data in each of those red-eye regions with the original image data from that red-eye region.

31. An electronic device, comprising:
means for storing a digital image on which automatic red-eye correction has been performed, the digital image having accompanying metadata comprising original image data from each of at least one red-eye regions and a location indicator for each red-eye region, each red-eye region comprising an area of the digital image in which the original image data has been replaced with corrected image data; and means for undoing red-eye correction in at least one red-eye region by replacing the corrected image data in each of those red-eye regions with the original image data from that red-eye region.

* * * * *